(12) United States Patent
Scekic et al.

(10) Patent No.: US 8,968,133 B2
(45) Date of Patent: Mar. 3, 2015

(54) DYNAMIC RATIO SPEED INCREASER FOR WINDMILLS AND SIMILAR APPLICATIONS

(75) Inventors: Vladimir Scekic, New Westminster (CA); Russell Turnbull, Coquitlam (CA); Daniel Constantin Popa, Vancouver (CA); Soegi Hartono, Coquitlam (CA)

(73) Assignee: MiVa Engineering Ltd., Burnaby (CA)

( * ) Notice: Subject to any disclaimer, the term of this patent is extended or adjusted under 35 U.S.C. 154(b) by 513 days.

(21) Appl. No.: 13/116,274

(22) Filed: May 26, 2011

(65) Prior Publication Data

US 2012/0302388 A1 Nov. 29, 2012

(51) Int. Cl.
*F16H 3/72* (2006.01)
*F16H 37/06* (2006.01)
*F03D 11/02* (2006.01)
*F16H 37/08* (2006.01)

(52) U.S. Cl.
CPC ............ *F03D 11/02* (2013.01); *F16H 37/0813* (2013.01); *F05B 2260/40311* (2013.01); *Y02E 10/722* (2013.01)
USPC ............................................... 475/5; 475/330

(58) Field of Classification Search
USPC ......... 475/1, 3, 4, 5, 150, 154, 157, 207, 219, 475/288, 311, 330, 343, 337
See application file for complete search history.

(56) References Cited

U.S. PATENT DOCUMENTS

| | | | |
|---|---|---|---|
| 6,607,464 B1 | 8/2003 | Bauer | |
| 7,625,307 B2 * | 12/2009 | Usoro | ............................... 475/5 |
| 8,188,613 B2 * | 5/2012 | Lee | .................................. 290/54 |
| 2006/0008351 A1 * | 1/2006 | Belinsky | ................... 416/170 R |
| 2010/0032218 A1 * | 2/2010 | Ideshio et al. | ........... 180/65.225 |
| 2010/0105512 A1 | 4/2010 | Berger | |
| 2010/0296933 A1 | 11/2010 | Hicks | |
| 2011/0033299 A1 | 2/2011 | Leimann | |
| 2011/0143875 A1 * | 6/2011 | Ono et al. | .......................... 475/5 |
| 2012/0302387 A1 * | 11/2012 | Scekic et al. | ....................... 475/5 |

FOREIGN PATENT DOCUMENTS

| | | |
|---|---|---|
| CA | 2714440 A1 | 8/2009 |
| WO | 9119916 A1 | 12/1991 |
| WO | WO 2010046765 A1 * | 4/2010 ............. B60K 6/405 |

* cited by examiner

*Primary Examiner* — Justin Holmes
(74) *Attorney, Agent, or Firm* — Oyen Wiggs Green & Mutala LLP

(57) ABSTRACT

A fluid driven rotary prime mover assembly including a turbine, a first generator, a second generator and a speed increaser is provided. The gear assembly includes a first epicyclic and a second epicyclic. The first epicyclic includes a first carrier rotationally connected to the turbine, a first sun rotationally connected to the first generator, a first annulus, and a first planet in meshing engagement with the first sun and the first annulus. The second epicyclic includes a second carrier rotationally grounded, a second sun rotationally connected to the second generator, a second annulus connected to the first annulus, and a second planet in meshing engagement with the second sun and the second annulus.

19 Claims, 6 Drawing Sheets

DYNAMIC RATIO SPEED INCREASER FOR WINDMILLS AND SIMILAR APPLICATIONS

TECHNICAL FIELD

This invention relates to speed increasing devices for fluid driven rotary prime movers such as windmills and similar applications.

BACKGROUND

Modern day windmills convert wind energy into electricity. Tidal, current, and wave power installations convert the energy of tides, currents and waves into electricity. Fluid driven rotary prime movers such as turbines associated with these and similar applications rotate slowly relative to generator rotation speeds useful for producing electricity. Efficient and cost-effective speed increasers for increasing this slow speed to speeds useful for electricity generation are desirable.

SUMMARY

The following embodiments and aspects thereof are described and illustrated in conjunction with apparatus and methods which are meant to be exemplary and illustrative, not limiting in scope. In various embodiments, one or more of the above-described problems have been reduced or eliminated, while other embodiments are directed to other improvements.

One aspect provides a fluid driven rotary prime mover assembly including a turbine, a first generator, a second generator and a speed increaser. The speed increaser includes a first epicyclic and a second epicyclic. The first epicyclic includes a first carrier rotationally connected to the turbine, a first sun rotationally connected to the first generator, a first annulus, and a first planet in meshing engagement with the first sun and the first annulus. The second epicyclic includes a second carrier rotationally grounded, a second sun rotationally connected to the second generator, a second annulus connected to the first annulus, and a second planet in meshing engagement with the second sun and the second annulus.

The first annulus and the second annulus may be integral and form a common annulus. The first annulus and the second annulus may be rotationally connected. The first annulus and the second annulus may be rotationally connected by a gear train. A total geometric reduction ratio for each torque path from the turbine to each of the first generator and the second generator may provide for optimal turbine/generator matching with only one of the first generator or the second generator running. The first epicyclic and second epicyclic may be symmetrical, where key geometric values such as number of teeth of respective components between the two epicyclics are equal. A first braking means may be provided for preventing rotation of the first sun if the first generator is not running. A second braking means may be provided for preventing rotation of the second sun if the second generator is not running. The first generator and the second generator may be operable in the same and opposite directions. The first epicyclic and the second epicyclic may be concentrically arranged. The second sun may be disposed on a hollow shaft and the first sun may be disposed on a first generator shaft extending through the hollow shaft.

A gear train may rotationally connect the second sun to the second generator. The gear train may include a proximal gear fixed to the hollow shaft and a distal gear fixed to a second generator shaft. The speed increaser may include a third epicyclic rotationally connecting the first carrier to the turbine, wherein the first carrier is in meshing engagement with a third sun of the third epicyclic. The second carrier may be fixed to a housing of the fluid driven rotary prime mover assembly.

In addition to the exemplary aspects and embodiments described above, further aspects and embodiments will become apparent by reference to the drawings and by study of the following detailed descriptions

BRIEF DESCRIPTION OF THE FIGURES

Exemplary embodiments are illustrated in referenced figures of the drawings. It is intended that the embodiments and figures disclosed herein are to be considered illustrative rather than restrictive.

DETAILED DESCRIPTION

The invention provides a dynamic ratio speed increaser for fluid driven rotary prime movers. The speed increaser of the invention in some embodiments features a two-generator design with paired epicyclical gear systems.

Generating electricity from rotary prime movers driven by non-uniform movement of fluids such as winds, tides, currents, waves and the like involves one or more of: (a) significant variability and frequent unpredictability of conditions, especially in the case of windmills; (b) a mismatch in performance characteristics between turbines or similar devices used to convert kinetic energy of moving fluid into rotary mechanical movement and generators used to convert the rotary mechanical movement into electricity; and (c) the requirement for reliable unmanned operation, often in remote areas with little or no access for maintenance.

For the purposes of illustration, the description herein will focus on the example of windmills, where the variability of conditions and mismatch in performance characteristics between turbines and generators in windmills is particularly pronounced. The invention applies not only to windmills but also to any "fluid driven rotary prime mover assembly", a term as used herein referring to any assembly that relies on non-uniform movement of fluids such as winds, tides, currents, and waves to drive a rotary prime mover. In some embodiments the non-uniform movement of fluids may be limited to naturally occurring movement of fluids. The term "rotationally connected" as used herein refers to both direct and indirect rotational connections. A direct connection may include, for example, meshing engagement between teeth of respective gears. An indirect rotational connection may include, for example, connection through a gear train or the like.

Figure 1:
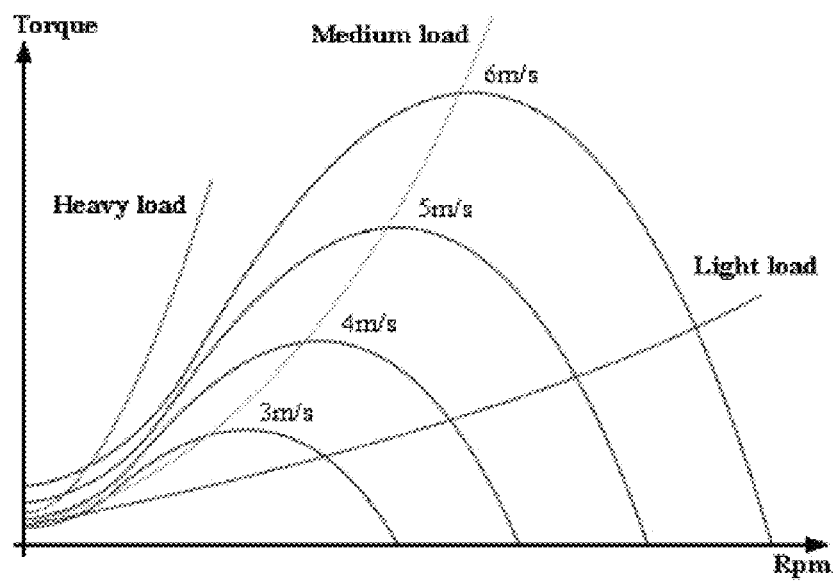
FIG. 1 is a graph plotting torque against rotational speed for various wind speeds and various loads.

The ability of a typical windmill to convert wind speed into active rotational torque increases with increasing wind speeds and rotational speed of the windmill's turbine up to a predetermined maximum value. As shown by the plots in FIG. 1, for any constant wind speed, the turbine's torque-generating capacity drops sharply with increasing rotational speed once the predetermined maximum value has been reached.

In order to extract the maximum amount of energy from the turbine in varying wind conditions, the generator will have to be operational at varying rotational speeds. Operating the generator at varying rotational speeds typically requires a variable frequency drive (VFD) control system. Adding a VFD control system involves considerable added capital costs, and significantly affects overall efficiency of the system. Modern VFDs feature average efficiencies in the 85-95% range depending on operating conditions.

Figure 2:
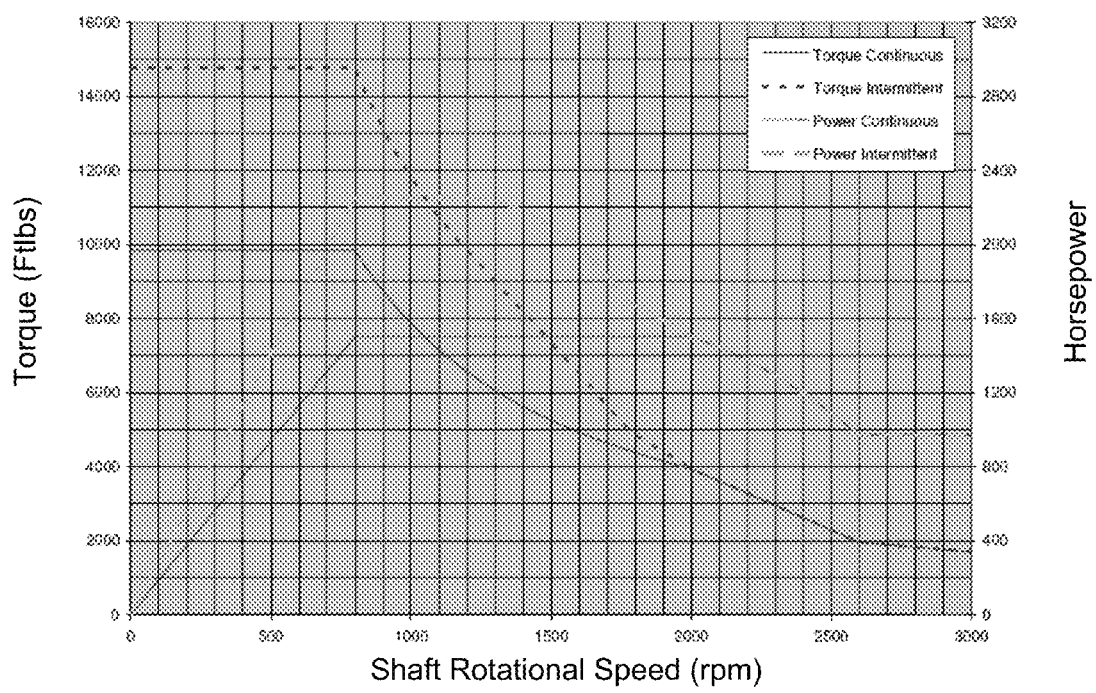
FIG. 2 is a graph plotting torque against rotational speed and horsepower against rotational speed for continuous and intermittent conditions.

FIG. 2 are plots of typical characteristics of a VFD controlled motor/generator. Special attention should be paid to the Torque vs. Shaft Rotational Speed curve (Torque Continuous line). A generator's ability to provide reactive torque is highest at low rotational speeds. At about synchronous design-speed, reactive torque starts dropping along a constant-power curve, then starts falling-off along a "diminishing return" line.

With increasing wind speeds, torque available at the turbine will also increase but at a higher rotational speed of the turbine. However, a generator's ability to absorb the torque drops with increased rotational speed, which may bring the windmill into unstable operating conditions where any disturbances are amplified rather than diminished. In extreme cases, high wind speeds may lead to a continuously accelerating system and ultimate failure. To avoid this scenario during high wind speeds, windmills must be shut down by engaging mechanical brakes. In other words, windmills are shut down during periods when most wind power is available for conversion into electricity.

The mismatch between a turbine's ability to produce torque and a generator's ability to absorb the torque can be partially corrected by use of a variable pitch turbine. Even with such an approach, typical windmill operating conditions remain very narrow; at wind speeds below and above the narrow operating range, the windmill has to be shut down and the turbine has to be restrained from rotation by means of mechanical braking.

Most high powered, modern windmill turbines are designed to efficiently operate in the range of about 16-28 rpm. Most modern generators are designed to operate in the range of 600-1500 rpm. A speed increaser is required between the turbine and the generator to bridge the gap in operating speeds between the two.

One object of this invention is to provide a speed increaser for a fluid driven rotary prime mover assembly that will allow for greater flexibility and better matching of performance characteristics between the turbine and the generator attached to the turbine, over a wider operating range. Another object is to provide a speed increaser for a fluid driven rotary prime mover assembly that will minimize or eliminate the need for VFD control under at least certain operating conditions.

Figure 3:
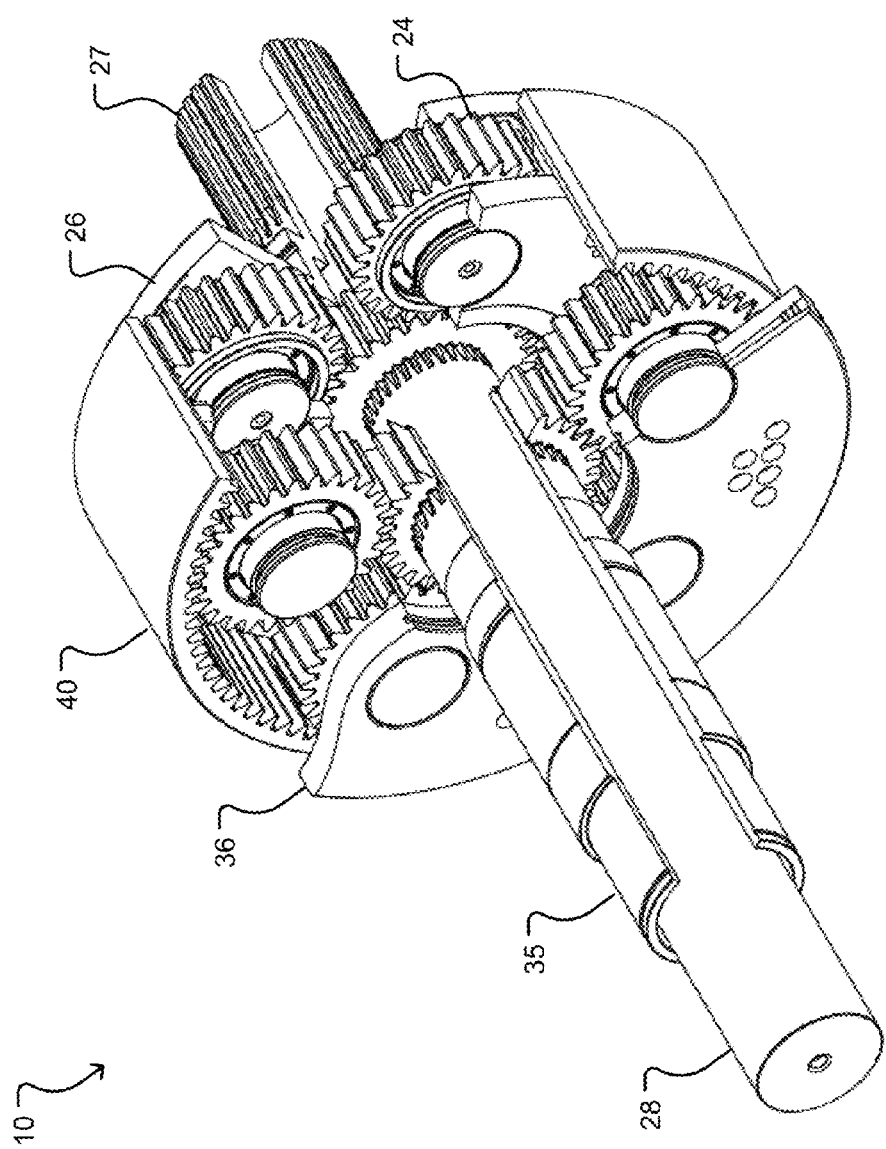
FIG. 3 shows a cutaway perspective view of a speed increaser according to one embodiment of the invention.
Figure 4:
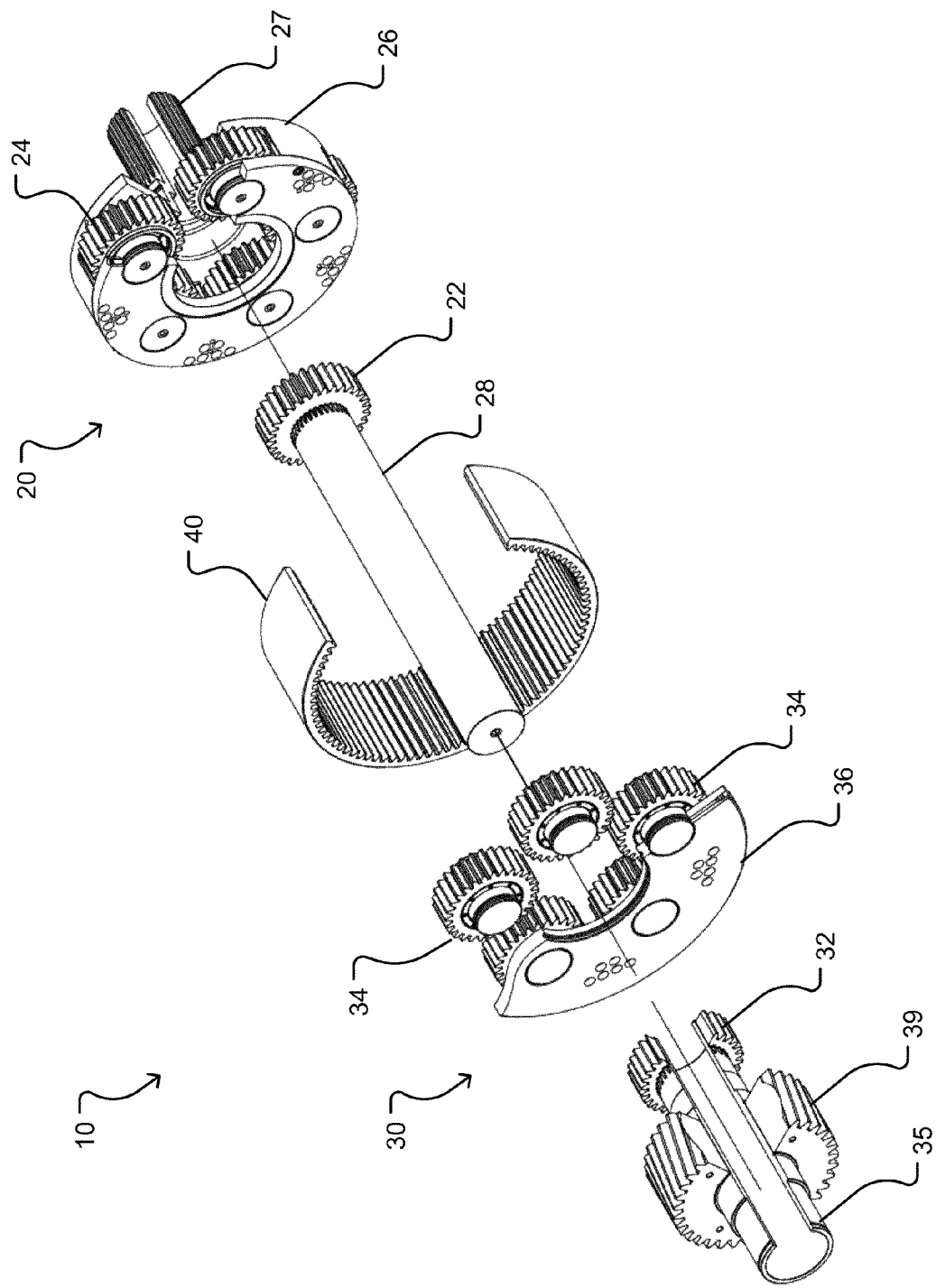
FIG. 4 shows a partially exploded perspective view of the speed increaser shown in FIG. 3.
Figure 5:
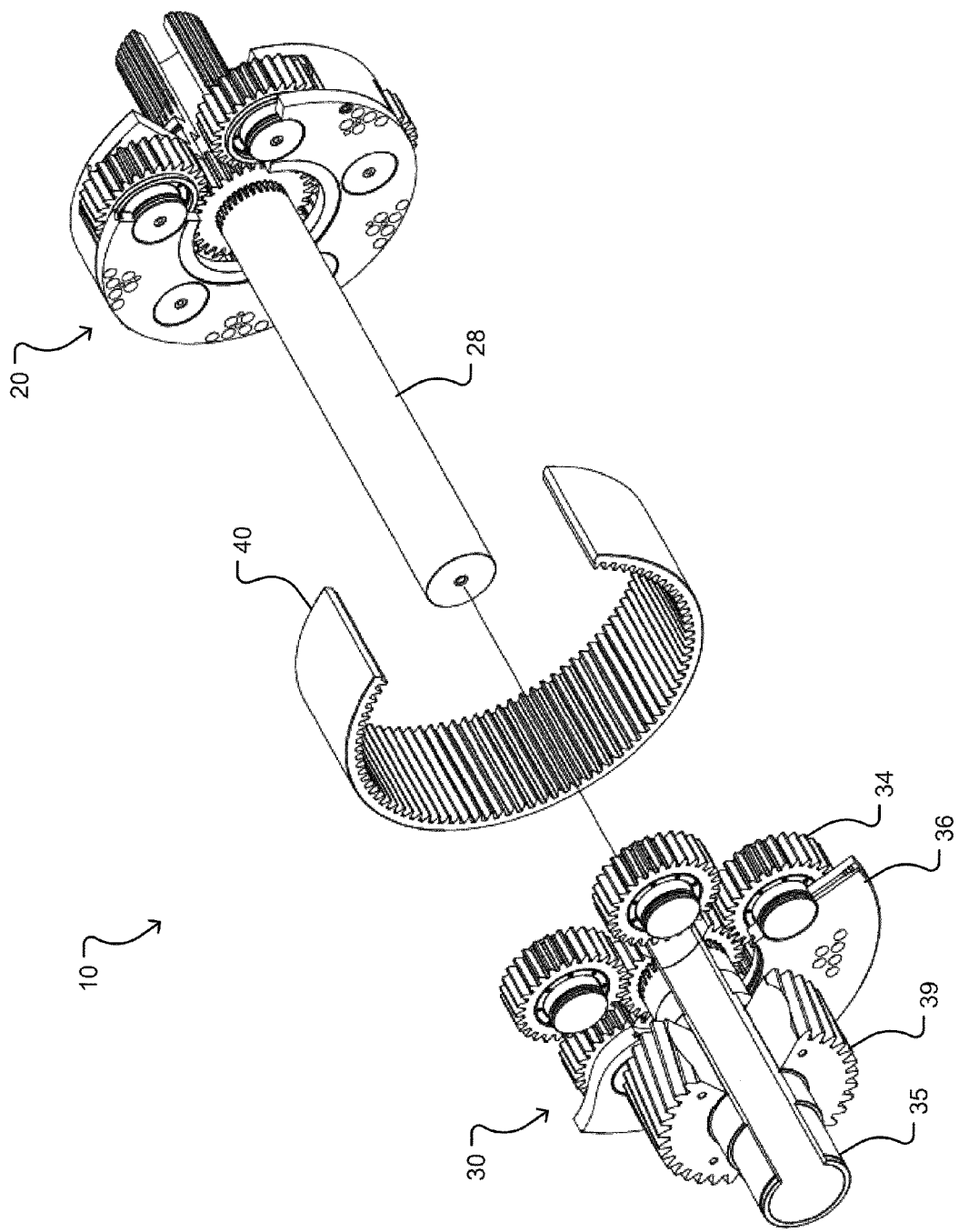
FIG. 5 shows a partially exploded perspective view of the speed increaser shown in FIG. 3.

FIGS. 3 to 5 shows a speed increaser 10 for a fluid driven rotary prime mover assembly of a windmill according to one embodiment of the invention. Speed increaser 10 includes a main epicyclic 20 and control epicyclic 30.

Main carrier 26 is rotationally connected to a turbine or similar device (not shown) of the fluid driven rotary prime mover assembly through pinion-like extension 27 of main carrier 26. Main sun 22 is meshingly engaged with main planets 24. Main sun 22 is also rotationally connected to a first generator (not shown) of the fluid driven rotary prime mover assembly. In the illustrated embodiment, this connection includes a main shaft 28 fixed to main sun 22. Control carrier 36 is rotationally grounded or fixed, making control epicyclic 30 a de facto "star arrangement". Control carrier 36 may for example be fixed to a housing (not shown) of the fluid driven rotary prime mover assembly. Control sun 32 is meshingly engaged with control planets 34. Control sun 32 is also rotationally connected to a second generator (not shown) of the fluid driven rotary prime mover assembly. In the illustrated embodiment, this connection includes a hollow shaft 35 fixed to control sun 32. A control gear train 39 in rotational connection with the second generator is also fixed to hollow shaft 35.

In the illustrated embodiment, compact, axial alignment between main epicyclic 20 and control epicyclic 30 is achieved by having main shaft 28 extend through hollow shaft 35 which itself extends through control epicyclic 30.

Common annulus 40 rotationally connects main epicyclic 20 to control epicyclic 30 by meshing engagement with main planets 24 and control planets 34. In other embodiments each of the main epicyclic 20 and control epicyclic 30 may have corresponding annuli which in turn are rotationally connected to each other.

Figure 6:
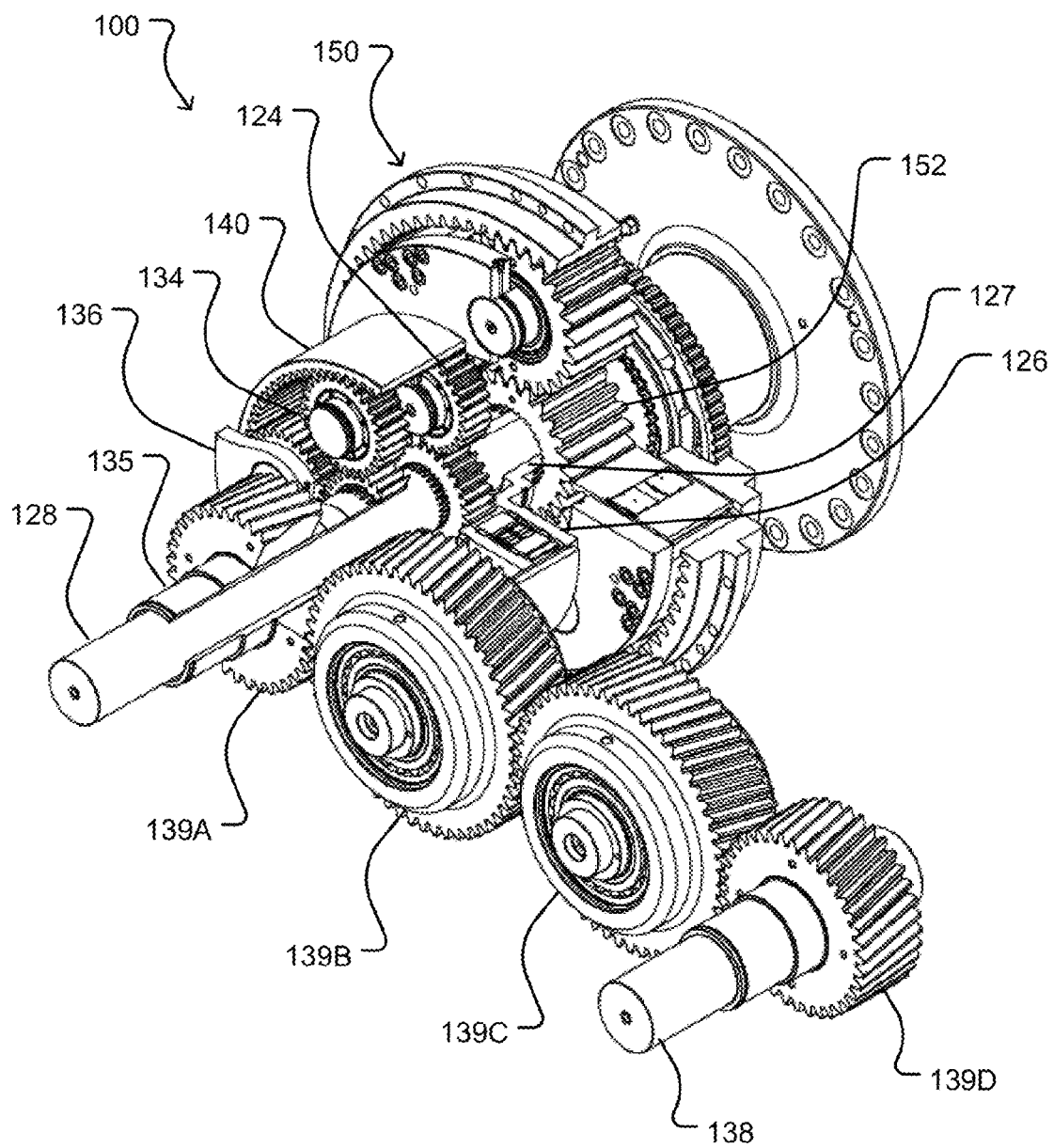
FIG. 6 shows a cutaway perspective view of a speed increaser according to one embodiment of the invention.
Figure 7:
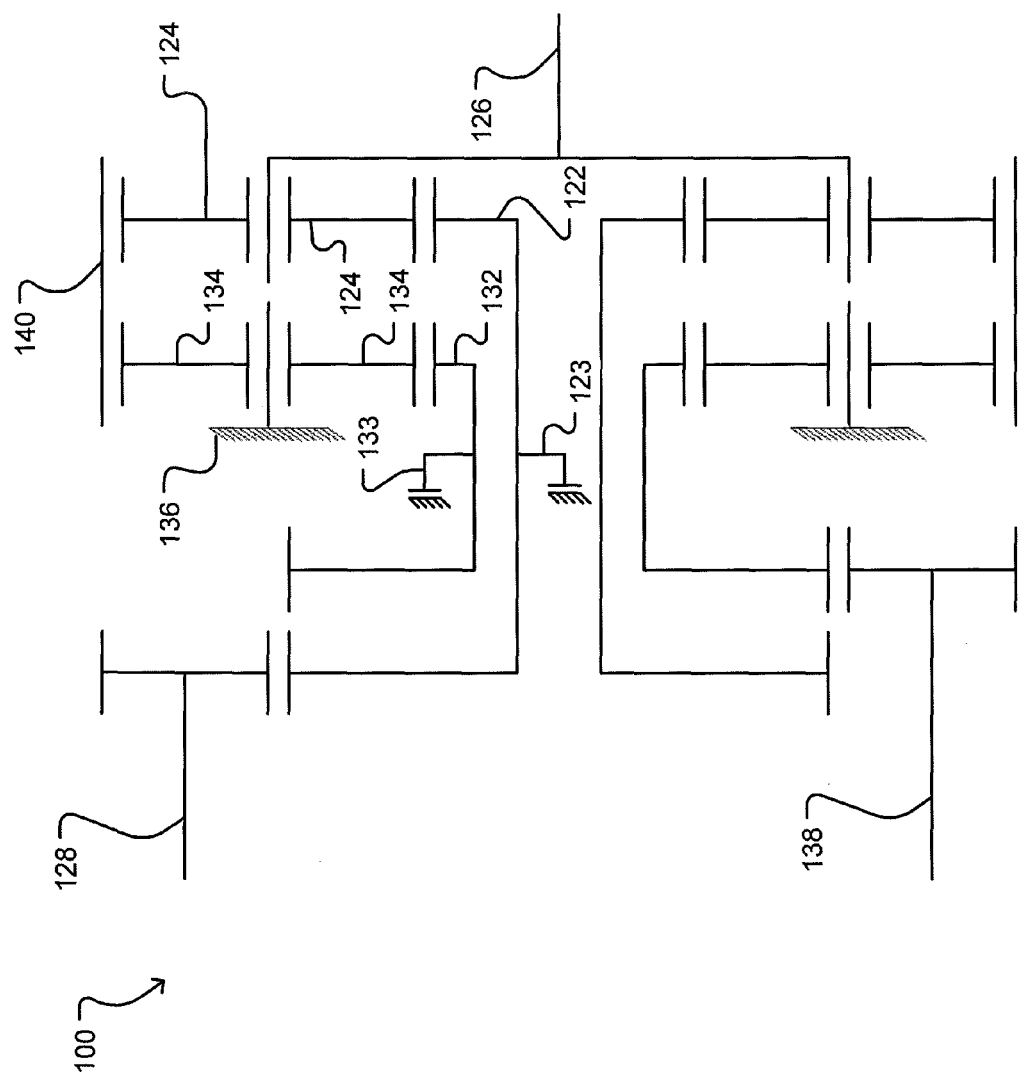
FIG. 7 shows a schematic view of the speed increaser shown in FIG. 6.

FIGS. 6 and 7 show a speed increaser 100 of a fluid driven rotary prime mover assembly according to another embodiment of the invention. Speed increaser 100 is similar to speed increaser 10. Main sun 122, main planets 124, main carrier 126, pinion-like extension 127, main shaft 128, control sun 132, control planets 134, hollow shaft 135, and control carrier 136 have similar functions to corresponding components of speed increaser 10. Brake 123 may selectively engage main sun 122 and brake 133 may selectively engage control sun 132. Brakes 123 and 133 may be connected to a housing of speed increaser 100. Speed increaser 100 also includes a gear train 139A, 139B, 139C, 139D and control shaft 138 for rotationally connecting control sun 132 to the second generator (not shown) of the fluid driven rotary prime mover assembly. Speed increaser 100 also includes an initial speed increasing epicyclic 150 for connecting main carrier 126. In particular, pinion-like extension 127 of main carrier 126 meshingly engages inner teeth of sun 152 of initial speed increasing epicyclic 150.

In the embodiments described above, the total geometric reduction ratio for respective torque paths from the turbine to the first generator and the turbine to the second generator provides optimal matching between turbine and generator with just one of either of the two generators running.

Some embodiments may have full and symmetrical redundancy, wherein the main epicyclic and control epicyclic possess identical key geometric values (e.g. number of teeth of respective components). Other embodiments may be asymmetrical.

According to the above-described embodiments, annulus rotational speed will be determined by the rotational speed of the control sun and will be equal to:

$$w_A = w_{s1} * N_{s1}/N_{a1}, \text{where:}$$

$w_A$—is the rotational speed of the annulus,
$w_{s1}$—is the rotational speed of the control sun,
$N_{a1}$—is the number of teeth of annulus on the control epicyclic side and,
$N_{s1}$—is the number of teeth of the control sun.

The dynamic reduction ratio of the main epicyclic, defined as the (rotational speed of the main sun) divided by the (rotational speed of the main carrier) can mathematically be described as follows:

$$i_{md} = w_{s2}(N_{a2}+N_{s2})/(N_{a2}*w_A+N_{s2}*w_{s2}), \text{where:}$$

$i_{md}$—is the dynamic reduction ratio relative to the main sun,
$w_{s2}$—is the rotational speed of main sun,
$w_A$—is the rotational speed of the annulus,
$N_{a2}$—is the number of teeth of annulus gear on the main epicyclic side, and
$N_{s2}$—is the number of teeth of main sun.

Combining the two equations, we come to the following simplified equation:

$$i_{md} = w_{s2}(N_{a2}+N_{s2})/(w_A * N_{a2} + w_{s2} * N_{s2}).$$

The dynamic reduction ratio of the control epicyclic, defined as the (rotational speed of the control sun) divided by the (rotational speed of the main carrier), is a two-step process and can mathematically be described as follows:

$$i_{cd} = N_{a1}/N_{s1} * w_A * (N_{a2}+N_{s2})/(N_{a2}*w_A+N_{s2}*w_{s2}),$$
where:

$i_{cd}$—is the dynamic reduction ratio relative to the control sun,
$w_{s2}$—is the rotational speed of main sun,
$w_A$—is the rotational speed of the annulus,
$N_{a1}$—is the number of teeth of annulus on control epicyclic side,
$N_{a2}$—is the number of teeth of annulus on main epicyclic side,
$N_{s1}$—is the number of teeth of control sun, and
$N_{s2}$—is the number of teeth of main sun.

From the above we come to the following simplified equation:

$$i_{cd} = w_{s1}(N_{a2}+N_{s2})/(w_{s1}*N_{s1}+w_{s2}*N_{s2})$$

The two simplified equations above are universal equations. For the special case of "symmetrical" epicyclics where key geometric values such as number of teeth of respective components between the two epicyclics are equal, these equations become:

$$i_{md} = w_{s2}(N_a+N_s)/(N_s(w_{s1}+w_{s2})), \text{ and,}$$

$$i_{cd} = w_{s1}(N_a+N_s)/(N_s(w_{s1}+w_{s2})).$$

$i_{md}$—is the dynamic reduction ratio relative to the main sun,
$i_{cd}$—is the dynamic reduction ratio relative to the control sun,
$w_{s2}$—is the rotational speed of the main sun,
$w_{s1}$—is the rotational speed of the control sun,
$N_a$—is the number of teeth of the annulus,
$N_s$—is the number of teeth of the main sun.

The above equations can be understood in simpler terms as follows. If rotational speed of either sun is zero (0), the dynamic ratio defined as the (rotational speed of the other sun) divided by the (rotational speed of the main carrier), will be equivalent to a simple planetary design, i.e.:

$$i = N_a/N_s + 1$$

If rotational speed of the two suns is equal in both, magnitude and direction ($w_{s1}=w_{s2}$), the dynamic ratio defined as the (rotational speed of the main sun) divided by the (rotational speed of the main carrier), will be equivalent to one half (½) of a simple planetary design, i.e.:

$$i = (N_a/N_s + 1)/2$$

If rotational speed of the two suns is equal in intensity but opposite in direction ($w_{s1}=(-w_{s2})$), the dynamic ratio defined as the (rotational speed of the main sun) divided by the (rotational speed of the main carrier), will be infinite (rotational speed of the main carrier will be zero (0)).

The foregoing can be put in other terms as follows.

During high wind speeds, the high torque, high speed rotation of the turbine can be divided between the two generators such that each of them operates with high torque and power ratings, still within stable operating regime with high reserve of generator torque available.

During most operating conditions, generator torque can be manipulated such that only one of them is VFD controlled while the other one operates at synchronous speed and can be connected to the grid "across the lines" thus improving overall generating efficiency.

During low wind speeds, one generator can function as a motor (through VFD controls) drawing energy from the grid in order to speed up the other generator thus bringing it up to optimum generating conditions. The gain in efficiency of the generator should be adequate to offset the energy draw from the grid used by the motor.

Overall, by implementing the present invention in windmills, the "window of opportunity" and generating capacity for producing electricity can be considerably increased for all (high, moderate and low) wind conditions.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A fluid driven rotary prime mover assembly comprising:
   a turbine;
   a first generator;
   a second generator; and
   a speed increaser comprising a first epicyclic and a second epicyclic,
   the first epicyclic comprising:
      a first carrier rotationally connected to the turbine;
      a first sun rotationally connected to the first generator;
      a first annulus;
      a first planet in meshing engagement with the first sun and the first annulus;
   the second epicyclic comprising:
      a second carrier rotationally grounded;
      a second sun rotationally connected to the second generator;
      a second annulus connected to the first annulus; and
      a second planet in meshing engagement with the second sun and the second annulus;
      wherein the first generator and the second generator are operable as generators in the same direction at the same time.

2. An assembly according to claim 1 wherein the first annulus and the second annulus are integral and form a common annulus.

3. An assembly according to claim 2 wherein the first annulus and the second annulus are rotationally connected.

4. An assembly according to claim 3 wherein the first annulus and the second annulus are rotationally connected by a gear train.

5. An assembly according to claim 2 wherein a total geometric reduction ratio for each torque path from the turbine to each of the first generator and the second generator provides for optimal turbine/generator matching with only one of the first generator or the second generator running.

6. An assembly according to claim 5 wherein the first epicyclic and second epicyclic are symmetrical.

7. An assembly according to claim 6 further comprising first braking means for preventing rotation of the first sun if the first generator is not running.

8. An assembly according to claim 7 further comprising second braking means for preventing rotation of the second sun if the second generator is not running.

9. An assembly according to claim 8 wherein the first generator and the second generator, wherein one of the first generator or the second generator is operating as a generator and the other as a motor, are operable in the opposite direction.

10. An assembly according to claim 9 wherein the first epicyclic and the second epicyclic are concentrically arranged.

11. An assembly according to claim 10 wherein the second sun is disposed on a hollow shaft and the first sun is disposed on a first generator shaft extending through the hollow shaft.

12. An assembly according to claim 11 comprising a gear train rotationally connecting the second sun to the second generator.

13. An assembly according to claim 12 wherein the gear train comprises a proximal gear fixed to the hollow shaft and a distal gear fixed to a second generator shaft.

14. An assembly according to claim 13 wherein the speed increaser further comprises a third epicyclic rotationally connecting the first carrier to the turbine, wherein the first carrier is in meshing engagement with a third sun of the third epicyclic.

15. An assembly according to claim 14 wherein the second carrier is fixed to a housing of the assembly.

16. An assembly according to claim 15 wherein the assembly is a windmill.

17. An assembly according to claim 15 wherein the assembly is a tidal power installation.

18. An assembly according to claim 15 wherein the assembly is a current power installation.

19. An assembly according to claim 15 wherein the assembly is a wave power installation.

* * * * *